Oct. 27, 1959    C. E. JENNINGS, JR    2,910,307
UNIVERSAL HITCH FOR SPREADER BOXES AND THE LIKE
Filed May 9, 1958    2 Sheets-Sheet 1
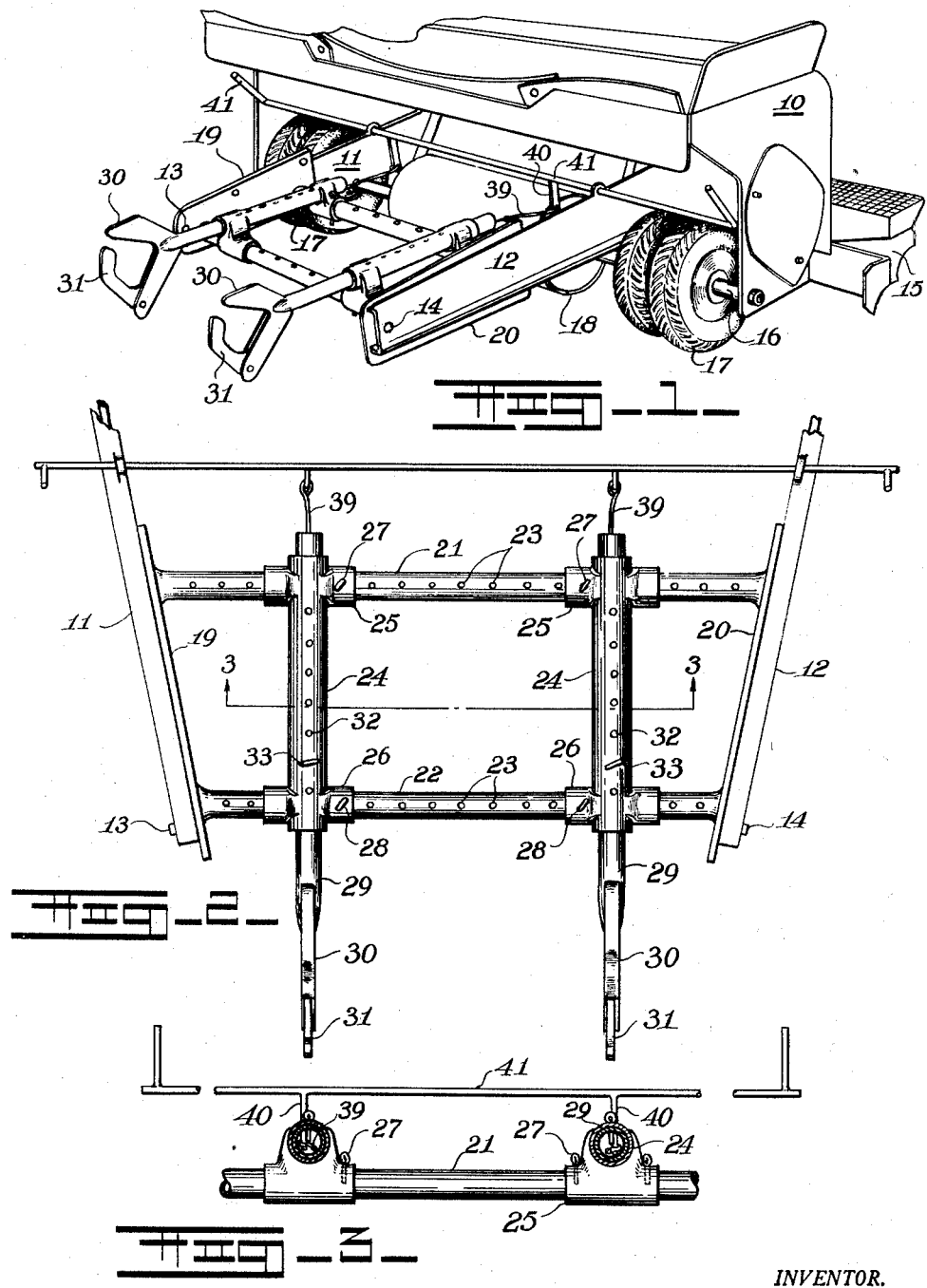
INVENTOR.
Charles E. Jennings, Jr.
BY
W. B. Harpman
ATTORNEY.

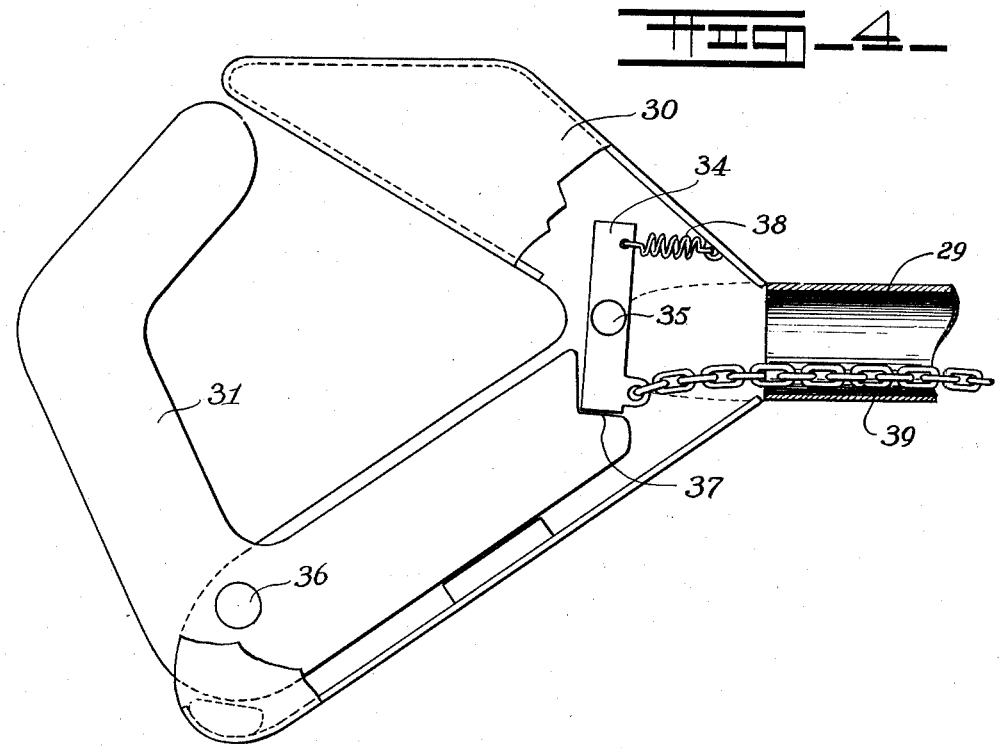
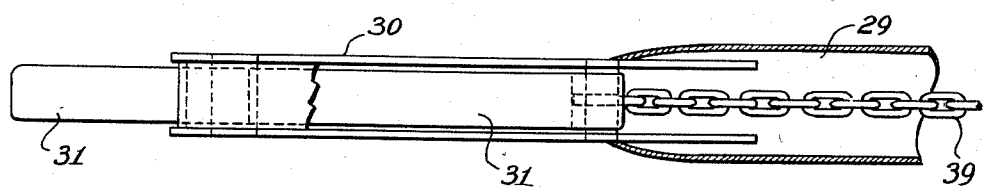
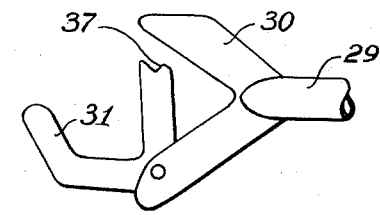

United States Patent Office 2,910,307
Patented Oct. 27, 1959

2,910,307

UNIVERSAL HITCH FOR SPREADER BOXES AND THE LIKE

Charles E. Jennings, Jr., Youngstown, Ohio

Application May 9, 1958, Serial No. 734,314

3 Claims. (Cl. 280—460)

This invention relates to a spreader box and more particularly to a universal hitch forming a part of the spreader box and acting to connect the spreader box to a vehicle so that it can be towed thereby.

The principal object of the invention is the provision of a universal hitch for a spreader box making possible the attachment of the spreader box to various types of hitch brackets on various vehicles.

A further object of the invention is the provision of an adjustable hitch for a spreader box arranged to permit the means engaging the towing vehicle to be adjusted laterally to selectively engage hitch devices on said towing vehicle regardless of their positioning thereon.

A still further object of the invention is the provision of a spreader box having elongated forwardly extending frame members and a hitch mechanism positioned between said frame members and mounted with respect thereto and extending forwardly thereof.

A still further object of the invention is the provision of a universal hitch for a spreader box incorporating means for remote actuation of the clamping jaws of the hitch to facilitate engagement and disengagement of the jaws on the hitch on a towing vehicle.

A still further object of the invention is the provision of a universal hitch for a spreader box incorporating novel clamping jaw constructions including means acting to hold said clamping jaws in closed relation.

The adjustable hitch for a spreader box disclosed herein comprises an improvement in the art relating to spreader boxes and particularly those having forwardly extending frame sections which incorporate screed floating arms.

The hitch disclosed herein is mounted between the forwardly extending frame portions of the box and arranged for transverse movement with respect thereto so that each of a pair of longitudinally extending jaw carrying arms may be selectively positioned transversely of the spreader box and thereby enabled to individually engage hitch brackets mounted on the towing vehicle.

With the foregoing and other objects in view which will appear as the description proceeds, the invention resides in the combination and arrangement of parts and in the details of contruction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a perspective view of a spreader box with parts broken away equipped with the universal hitch.

Figure 2 is a top plan view of the hitch shown in Figure 1 and in enlarged detail.

Figure 3 is a vertical section on line 3—3 of Figure 2.

Figure 4 is an enlarged detail of one of the clamping jaws shown in Figures 1 and 2.

Figure 5 is a top plan view of the clamping jaw shown in Figure 4.

Figure 6 is a side view on a smaller detail illustrating the clamping jaw in Figure 4 in open position.

By referring to the drawings and Figure 1 in particular it will be seen that a spreader box has been disclosed which includes a hopper 10 having a pair of transversely spaced, longitudinally extending frame members 11 and 12 secured thereto, and which frame members extend through said hopper and provide for the positioning of a pair of screed floating arms which are enclosed within said frame members 11 and 12 and pivoted at their forward ends by pivots 13 and 14 and adjustably secured at their rearmost ends to a screed 15. The hopper 10 and frame members 11 and 12 are supported by an axle 17 on which ground engaging pneumatic rubber tired wheels are mounted together with a roller 18.

A pair of secondary frame members 19 and 20 are secured to the frame members 11 and 12. A pair of tubular cross frame members 21 and 22 are positioned between the secondary frame members 19 and 20 and secured at their ends thereto. The tubular cross frame members 21 and 22 are spaced longitudinally of the device and are provided with a plurality of apertures 23—23 therein.

A pair of tubular members 24—24 are positioned above the tubular frame members 21 and 22 in right angle relation thereto and are provided with tubular brackets 25—25 slidably engaging the tubular cross frame member 21 and tubular brackets 26—26 engaging the tubular cross frame member 22.

It will thus be seen that each of the tubular members 24—24 may be moved transversely of the spreader box along the tubular cross frame members 21 and 22. Apertures in the tubular brackets 25—25, 26—26 register with the aperatures 23—23 in the tubular cross frame members 21 and 22 so that pins 27 and 28, respectively may be positioned therethrough and thus secure the tubular members 24—24 in desired position on the tubular cross frame members 21 and 22.

Each of the tubular members 24—24 is provided with a telescopically engaged tubular arm 29—29, the forward end of each of which carries a V-shaped bifurcated jaw 30—30. Each of the bifurcated jaws 30—30 has a jaw piece 31—31 pivoted thereto, as best seen in the enlarged detail of Figure 4 of the drawings.

By referring now to Figures 2 and 3 of the drawings, it will be seen that the tubular members 24—24 are apertured longitudinally to provide a plurality of longitudinally spaced apertures 32—32. The tubular arms 29—29 are similarly apertured so that pins 33—33 may be positioned through the registering apertures in the tubular members 24—24 and tubular arms 29—29 therein and thereby secure the same in adjusted position.

It will be seen that each of the tubular members 24—24 and its telescopically engaged arm 29 is capable of being moved transversely of the device and that the tubular arms 29—29 are capable of being moved longitudinally of the device so that the V-shaped bifurcated jaws 30—30 and their jaw pieces 31—31 may be individually positioned to engage appropriate means on the towing vehicle regardless of the location of said means.

By referring to Figures 4, 5 and 6 of the drawings it will be seen that each of the clamping jaws 30—30 includes wtihin its bifurcated body a pivoted latch 34 mounted on a pivot pin 35 which extends between the bifurcated portions of the clamp 30.

The pivoted latch 34 is positioned adjacent one end of the pivoted jaw 31 which in turn is pivoted in the bifurcated body 30 by a pivot pin 36. The adjacent end of the jaw 31 has a ledge 37 formed thereon for registry with one end of the pivoted latch 34. A spring 38 connected between the opposite end of the pivoted latch 34 and the body 30 normally biases the pivoted latch 34 toward the end of the jaw 31 and therefore maintains it in position on the ledge 37. A chain 39 secured to the pivoted latch 34 adjacent the end thereof engaged upon the ledge 37 forms means by which the pivoted latch 34 may be moved away from and out of engagement with the jaw 31.

The chain 39 extends rearwardly through the telescopically arranged tubes 29 and 24 and is connected at its rearward end to a depending portion 40 of a transverse actuating rod 41, as best seen in Figures 1 and 2 of the drawings.

It will thus be seen that by moving the transverse actuating rod 41 on the spreader box the pivoted latch 34 is moved to control the action of the movable jaw 31.

It will be obvious to those skilled in the art that the description of the single pivoted latch 34, clamping member 30 and jaw 31 applies to both of these constructions as heretofore described in connection with Figures 1, 2 and 3 of the drawings.

In Figure 4 of the drawings the jaw 31 is shown in closed position with respect to the clamping member 30 and in Figure 6 it is shown in open position.

It will thus be seen that the construction disclosed herein meets the several objects of the invention.

Having thus described my invention, what I claim is:

1. In a spreader box means for attaching said spreader box to a towing vehicle, said spreader box having a frame including transversely spaced frame members, said means including a pair of secondary frame members positioned on said frame members, tubular cross frame members positioned between said secondary frame members in spaced relation to one another, a pair of tubular members movably positioned on said tubular cross frame members and extending outwardly with respect thereto, a tubular arm telescopically positioned in each of said tubular members, each of said tubular arms having a V-shaped bifurcated jaw on its outermost end and each of said bifurcated jaws having a jaw piece pivoted thereto, said jaw pieces arranged to close the area between the open ends of said V-shaped bifurcated jaws and arranged to be movable to open said area, latch members in each of said bifurcated jaws engageable with said jaw pieces to retain the same in closed position and remote control means extending from said latch members for actuating the same.

2. The improvement in a hitch construction for a spreader box set forth in claim 1 wherein the tubular cross frame members and the tubular members are provided with a plurality of apertures, pins removably engaged in said apertures for releasably securing said tubular members to said tubular cross frame members.

3. An improved universal hitch for a spreader box having a frame extending forwardly therefrom, said hitch including a pair of transversely positioned cross frame members secured at their ends to said frame of said spreader box and positioned in spaced relation to one another, a pair of short tubular members slidably positioned on each of said cross frame members and a pair of tubular members positioned in parallel spaced relation to one another and secured to oppositely disposed pairs of said short tubular members, said tubular members having arms telescopically positioned therein, each of said arms having a bifurcated V-shaped jaw on one end thereof and each of said bifurcated jaws having a U-shaped jaw piece pivotally mounted therein.

References Cited in the file of this patent

UNITED STATES PATENTS

| 1,060,441 | Engel | Apr. 29, 1913 |
| 2,567,738 | Silver et al. | Sept. 11, 1951 |

FOREIGN PATENTS

| 465,878 | Canada | June 13, 1950 |
| 865,401 | Germany | Feb. 2, 1953 |